United States Patent
Krishnakumar et al.

(10) Patent No.: US 7,843,833 B2
(45) Date of Patent: Nov. 30, 2010

(54) DETECTION AND HANDLING OF LOST MESSAGES DURING LOAD-BALANCING ROUTING PROTOCOLS

(75) Inventors: Anjur Sundaresan Krishnakumar, Princeton, NJ (US); Parameshwaran Krishnan, Basking Ridge, NJ (US); Shalini Yajnik, Berkeley Heights, NJ (US); Sameh Gobriel, Pittsburgh, PA (US)

(73) Assignee: Avaya Inc., Basking Ridge, NJ (US)

( * ) Notice: Subject to any disclaimer, the term of this patent is extended or adjusted under 35 U.S.C. 154(b) by 266 days.

(21) Appl. No.: 11/937,909

(22) Filed: Nov. 9, 2007

(65) Prior Publication Data
US 2008/0117823 A1    May 22, 2008

Related U.S. Application Data

(60) Provisional application No. 60/865,132, filed on Nov. 9, 2006.

(51) Int. Cl.
*G01R 31/08* (2006.01)
*G06F 11/00* (2006.01)
*G08C 15/00* (2006.01)
*H04L 12/28* (2006.01)
*H04L 12/26* (2006.01)
*H04L 12/56* (2006.01)

(52) U.S. Cl. .................. 370/236; 370/254; 370/400
(58) Field of Classification Search .................. 370/238, 370/329, 338, 401, 351, 252, 349; 455/7
See application file for complete search history.

(56) References Cited

U.S. PATENT DOCUMENTS

| | | | |
|---|---|---|---|
| 6,691,169 B1 * | 2/2004 | D'Souza | 709/242 |
| 6,961,310 B2 * | 11/2005 | Cain | 370/238 |
| 7,002,924 B2 * | 2/2006 | Braun et al. | 370/254 |
| 7,197,326 B2 | 3/2007 | Acampora | |
| 7,200,149 B1 * | 4/2007 | Hasty, Jr. | 370/400 |
| 7,330,694 B2 * | 2/2008 | Lee et al. | 455/7 |
| 7,379,447 B2 * | 5/2008 | Dunagan et al. | 370/350 |

(Continued)

FOREIGN PATENT DOCUMENTS

WO    WO 2006098723 A1 *    9/2006

OTHER PUBLICATIONS

Sameh Gobriel, Daniel Mosse, Rami Melhem, "Mitigating the Flooding Waves Problem in Energy-Efficient Routing for MANETs", in Proceedings of the IEEE International Conference on Distributed Computing Systems, Lisbon Portugal, Jul. 4-7, 2006.

(Continued)

*Primary Examiner*—Jayanti K Patel
*Assistant Examiner*—Christopher T Wyllie
(74) *Attorney, Agent, or Firm*—DeMont & Breyer, LLC (57) ABSTRACT

Methods that enable the detection and handling of lost messages during load-balancing routing protocols are disclosed. In accordance with the illustrative embodiment, when a candidate intermediate node N receives a routing-protocol message, node N performs: (1) a first procedure that is capable of detecting some lost routing-protocol messages that were previously transmitted by node N, and (2) a second procedure that is capable of detecting some lost routing-protocol messages that were previously transmitted by a neighbor of node N.

12 Claims, 12 Drawing Sheets

U.S. PATENT DOCUMENTS

| | | | |
|---|---|---|---|
| 7,388,869 B2* | 6/2008 | Butehorn et al. | 370/401 |
| 7,457,265 B2* | 11/2008 | Julka et al. | 370/331 |
| 2002/0003780 A1* | 1/2002 | Braun et al. | 370/254 |
| 2004/0022223 A1* | 2/2004 | Billhartz | 370/338 |
| 2004/0022224 A1* | 2/2004 | Billhartz | 370/338 |
| 2004/0141511 A1* | 7/2004 | Rune et al. | 370/401 |
| 2005/0030921 A1* | 2/2005 | Yau | 370/329 |
| 2005/0053094 A1* | 3/2005 | Cain et al. | 370/469 |
| 2005/0089057 A1 | 4/2005 | Kang et al. | |
| 2005/0128958 A1 | 6/2005 | Hamdan | |
| 2005/0157697 A1* | 7/2005 | Lee et al. | 370/349 |
| 2006/0109787 A1* | 5/2006 | Strutt et al. | 370/235 |
| 2006/0250999 A1 | 11/2006 | Zeng et al. | |
| 2007/0008880 A1* | 1/2007 | Buchko et al. | 370/218 |
| 2007/0184837 A1 | 8/2007 | Hohl et al. | |
| 2007/0192451 A1* | 8/2007 | Tran et al. | 709/223 |
| 2008/0117823 A1* | 5/2008 | Krishnakumar et al. | 370/236 |
| 2008/0170550 A1* | 7/2008 | Liu et al. | 370/338 |
| 2008/0219154 A1* | 9/2008 | Durrey et al. | 370/225 |
| 2010/0067398 A1* | 3/2010 | Kutschenreuter | 370/252 |

OTHER PUBLICATIONS

Young, Steve R., "U.S. Appl. No. 11/937,911 Office Action Sep. 8, 2009", , Publisher: USPTO, Published in: US.

Young, Steve R., "U.S. Appl. No. 11/937,911 Office Action Mar. 26, 2010", , Publisher: USPTO, Published in: US.

* cited by examiner

DETECTION AND HANDLING OF LOST MESSAGES DURING LOAD-BALANCING ROUTING PROTOCOLS

CROSS-REFERENCE TO RELATED APPLICATIONS

This application claims the benefit of U.S. provisional application Ser. No. 60/865,132, filed Nov. 9, 2006, entitled "Multi-Hop Ad-Hoc Wireless IP Telephony," which is also incorporated by reference.

FIELD OF THE INVENTION

The present invention relates to telecommunications in general, and, more particularly, to multi-hop ad-hoc wireless networks.

BACKGROUND OF THE INVENTION

In a wireless ad-hoc network, nodes (e.g., wireless telecommunications terminals, etc.) communicate with each other via a mesh topology without a central access point or server. The term ad-hoc reflects the fact that nodes can form networks "on the fly" without any supporting networking infrastructure, as well as the fact that the mobility of nodes can result in frequent changes in network membership and topology.

Figure 1:
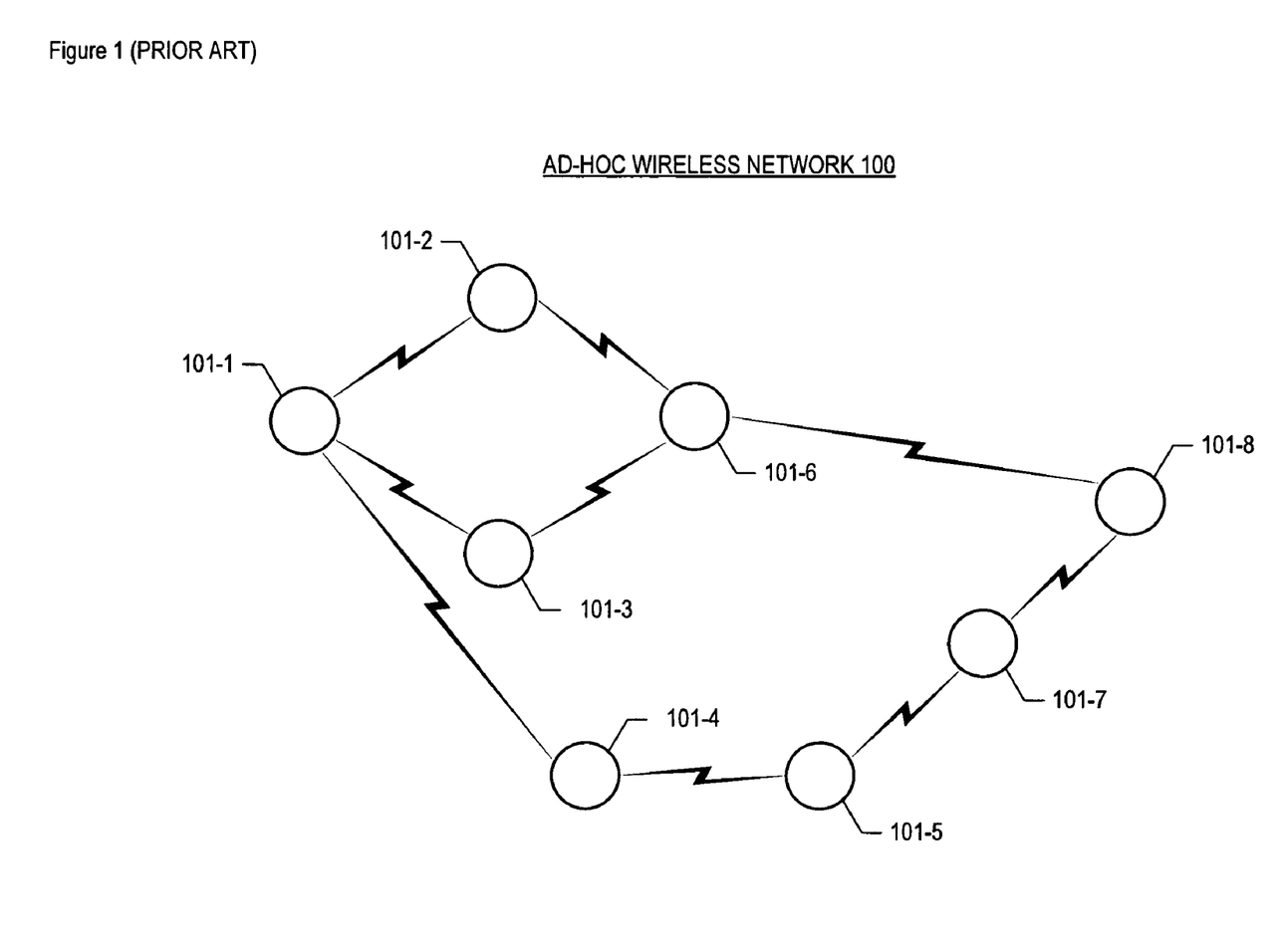
FIG. 1 depicts the salient elements of illustrative ad-hoc wireless network 100, in accordance with the prior art.

FIG. 1 depicts the salient elements of illustrative ad-hoc wireless network 100 in accordance with the prior art. As shown in FIG. 1, wireless network 100 comprises nodes 101-1 through 101-8; these nodes are capable of transmitting and receiving messages in point-to-point fashion via wireless communication links, which are depicted in FIG. 1 by "lightning bolts."

Typically nodes 101-1 through 101-8 communicate via any of a variety of wireless communications protocols, such as one of the Institute of Electrical and Electronics Engineers (IEEE) 802.11 family of protocols in ad-hoc mode (as opposed to the more-common infrastructure mode), the Bluetooth short-range wireless protocol, etc. When nodes 101-1 through 101-8 are capable of transmitting and receiving messages via a path comprising two or more wireless communication links (or "hops"), network 100 is said to be a multi-hop ad-hoc wireless network. In a multi-hop ad-hoc wireless network, a routing protocol guides the delivery of messages throughout the network.

Routing protocols can generally be classified into two categories: proactive, and reactive. Proactive routing protocols, such as Destination-Sequenced Distance-Vector (DSDV) routing, try to maintain correct routing information at all nodes in the network at all times. Proactive protocols are typically table-driven, with topology changes handled through periodic broadcast of routing table updates.

In contrast, reactive (or on-demand) routing protocols, such as Ad-hoc On-Demand Distance Vector (AODV) routing, Optimized Link State Routing (OLSR), and Dynamic Source Routing (DSR), obtain a route only when needed. Reactive routing protocols typically can support rapid rates of node mobility and frequent topology changes, but suffer from a larger route-setup overhead than proactive routing protocols. Proactive routing protocols, meanwhile, are either slow to respond to dynamism in the network, or require significant bandwidth overhead to maintain up-to-date routes.

Nodes along a route from a source node to a destination node are referred to as intermediate nodes. When a node serves as an intermediate node on a given route, this can place demands on the input/output and processing resources of the node. It is therefore advantageous if a routing protocol establishes routes in accordance with a load-balancing strategy that attempts to spread these demands evenly among various nodes in the network, rather than concentrating these demands on a small number of nodes.

Some load-balancing routing protocols use a load metric to estimate the loads at individual nodes, and then compute the overall load of a route via a "load-combining function" (e.g., a summation of the loads of the nodes in the route, the maximum load in a route, etc.). Some examples of load metrics include: the number of routes to which a node currently belongs; the average depth of a node's transmission buffer (i.e., how many packets on average are queued for transmission at the node); and so forth.

When a message is transmitted but is never received at its intended destination, that message is said to be lost. Lost messages can occur, for example, as a result of noise or collisions in a wireless channel.

SUMMARY OF THE INVENTION

The present invention enables the detection and handling of lost messages during load-balancing routing protocols. In accordance with the illustrative embodiment, when a candidate intermediate node N receives a routing-protocol message, node N performs a first procedure that is capable of detecting some lost routing-protocol messages that were previously transmitted by node N. In particular, the first procedure can detect some routing-protocol messages that were transmitted by node N and were not received, as they should have, at a neighbor of N (i.e., a node one hop away from N). What allows this detection is the fact that in the illustrative embodiment, the routing-protocol messages report not only the load of the partially-constructed route, but also the loads at a nonempty set of previous nodes in the route.

The second procedure is capable of detecting some routing-protocol messages that were transmitted by a neighbor of node N but that were not received by node N, as they should have. In particular, the second procedure examines the route R in a routing-protocol message that is received at node N. If route R contains an intermediate node that is a neighbor of node N, then there must have been a message that was previously transmitted by this neighbor but that wasn't received by node N. In this case, intermediate node N shortens route R so that it terminates at this neighbor, and then transmits a routing-protocol message with the shortened (and therefore lower-loaded) route.

The illustrative embodiment works with any load metric. Examples of a load metric at a node include:

the number of current routes in the network that include the node;

the depth of a node's transmission buffer over a time interval (e.g., average depth, maximum depth, etc.);

an estimate of the processing capacity available at a node (derived, perhaps, from CPU utilization);

an estimate of the processing requirements for the node to participate in a new route from the source node to the destination node;

an estimate of the input/output capacity available at a node;

an estimate of the input/output requirements for the node to participate in a new route from the source node to the destination node; and some combination of two or more of the above metrics.

Moreover, the illustrative embodiment can be used for other kinds of metrics, such as an energy metric for quantifying the energy (e.g., battery power, etc.) required to route a message through particular nodes.

The illustrative embodiment comprises: receiving at a first node in a network a first message from a second node in the network, wherein the first message is for establishing a route in the network from a source node in the network to a destination node in the network, and wherein the first message comprises (i) a route R from the source node to the second node, and (ii) the value of a load metric at one or more nodes in the route R; and inferring, after the receipt of the first message, that the second node did not receive a second message that was previously transmitted by the first node.

DETAILED DESCRIPTION

Figure 2:
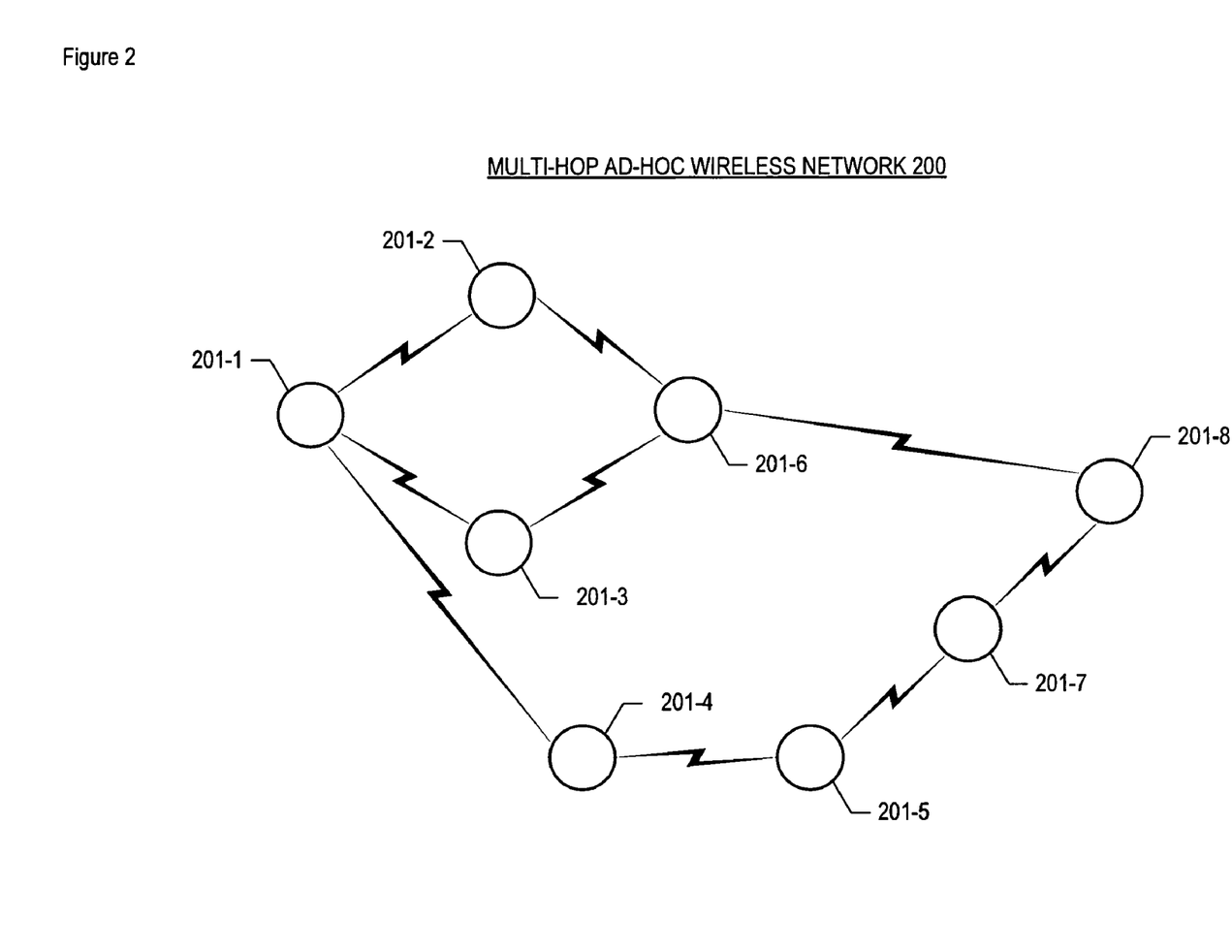
FIG. 2 depicts the salient elements of ad-hoc wireless network 200, in accordance with the illustrative embodiment of the present invention.

FIG. 2 depicts the salient elements of ad-hoc wireless network 200 in accordance with the illustrative embodiment of the present invention. As shown in FIG. 2, wireless network 200 comprises nodes 201-1 through 201-8, with wireless communication links between these elements indicated by "lightning bolts." Each of nodes 201-1 through 201-8 is capable of transmitting and receiving messages in point-to-point fashion via the wireless communication links of network 200, of participating as an intermediate node in a multi-hop route through ad-hoc wireless network 200, and of transmitting messages in a multicast (i.e., point-to-multipoint) mode, as is well-known in the art. Moreover, as is described below and with respect to FIGS. 5 through 10, each of nodes 201-1 through 201-8 is capable of maintaining: a routing cache, a list of route requests recently received by the node, and the best (e.g., lowest, etc.) load metric value encountered for each route request.

In accordance with the illustrative embodiment, on-demand routing is employed when a source node has a message to transmit to a destination node. In particular, a route is established by the following procedure: first, a route request (RREQ) is initiated by the source node and is propagated through ad-hoc wireless network 200 to the destination node; then, a route reply is initiated by the destination node and is propagated back through ad-hoc wireless network 200 to the source node.

Figure 3:
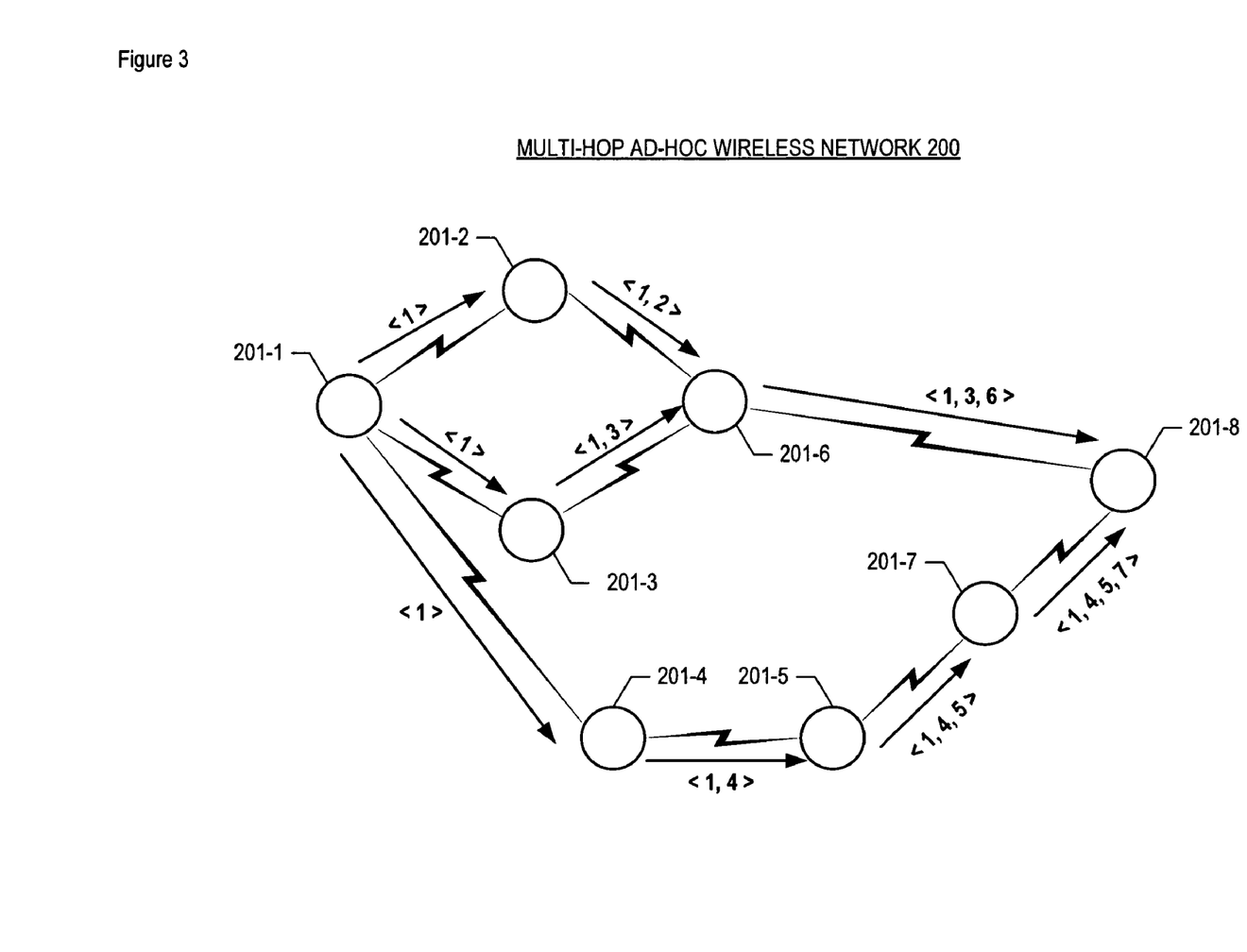
FIG. 3 depicts the propagation of a route request through ad-hoc wireless network 200, as depicted in FIG. 2, when node 201-1 has a message to transmit to node 201-8, in accordance with the illustrative embodiment of the present invention.

FIG. 3 depicts the propagation of a route request (RREQ) through ad-hoc wireless network 200 from source node 201-1 to destination node 201-8, in accordance with the illustrative embodiment of the present invention. In FIG. 3, the arrows indicate the direction in which the route request is transmitted between nodes, and the arrow labels indicate the route description that is transmitted along with the route request. For example, the labeled arrow from node 201-5 to node 201-7 indicates that node 201-5 transmits the partial route <201-1, 201-4, 201-5> to node 201-7 along with the route request. (FIG. 3 omits the "201-" portion of the route descriptions for brevity.) The exact mechanism by which the route request and associated information are propagated through ad-hoc wireless network 200 is described in detail below and with respect to FIGS. 5 through 7.

Figure 4:
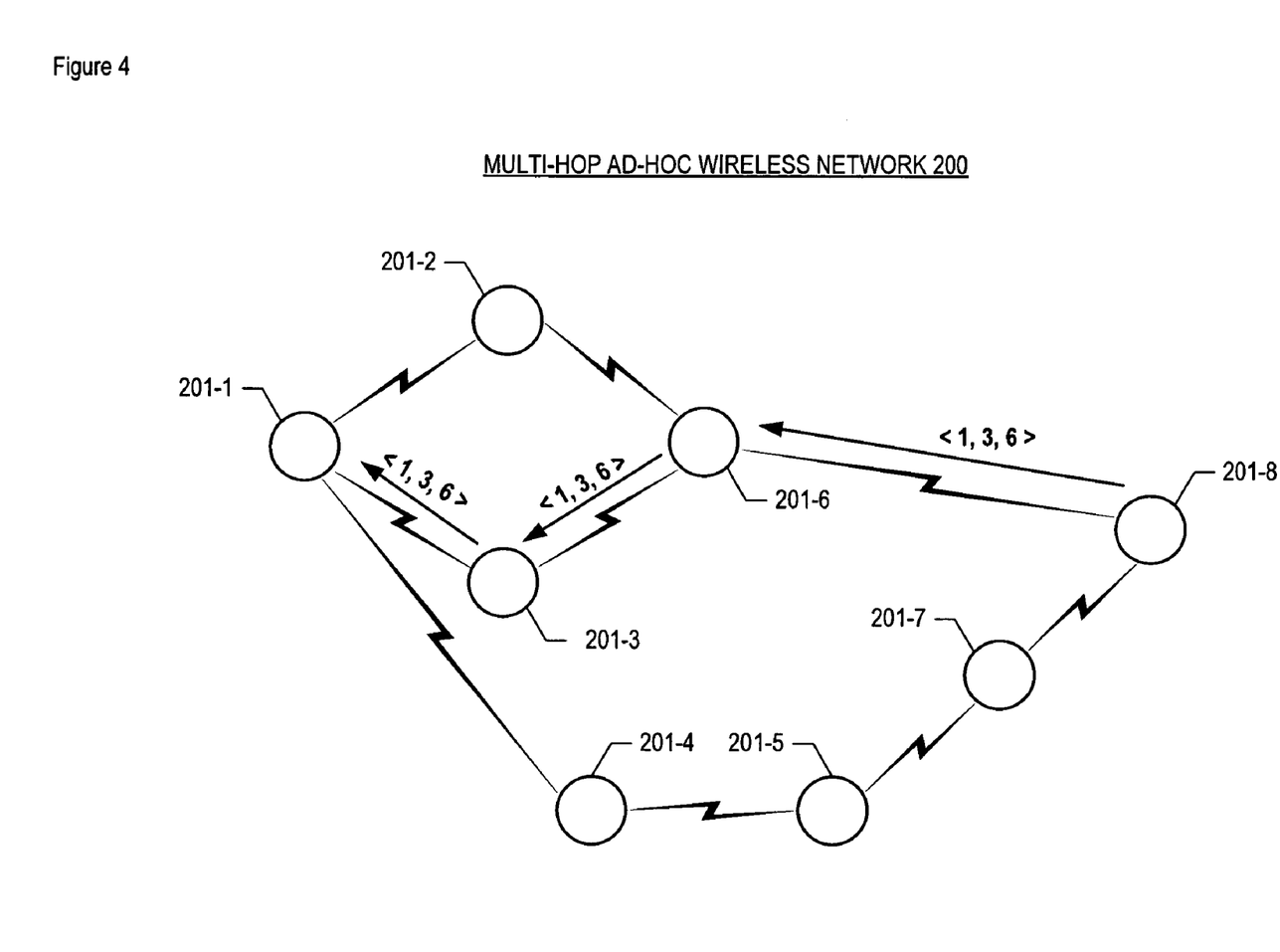
FIG. 4 depicts the transmission of a route reply from node 201-8 to node 201-1, in accordance with the illustrative embodiment of the present invention.

After the route request is received at destination node 201-8, a route reply is transmitted by destination 201-8 back to source node 201-1 along a route that is determined by destination node 201-8; the exact mechanism of this determination and transmission is described below and with respect to FIGS. 5 through 7. An illustrative transmission of a route reply from destination node 201-8 to source node 201-1 is shown in FIG. 4.

Figure 5:
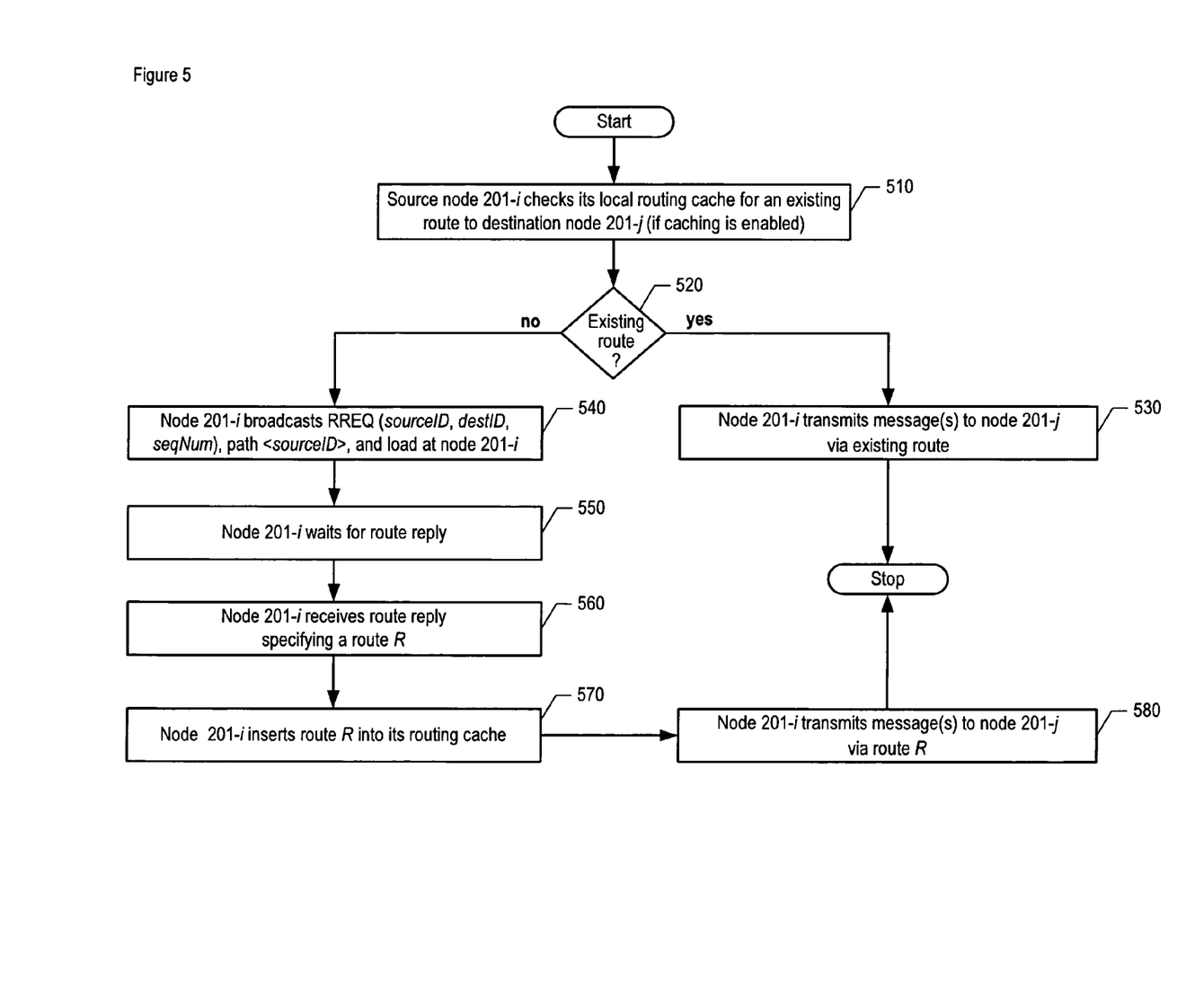
FIG. 5 depicts a flowchart of the salient tasks performed by a source node 201-$i$ in establishing a route to a destination node 201-$j$, in accordance with the illustrative embodiment of the present invention.

FIG. 5 depicts a flowchart of the salient tasks performed by a source node 201-$i$ in establishing a route to a destination node 201-$j$, in accordance with the illustrative embodiment of the present invention. It will be clear to those skilled in the art, after reading this disclosure, which tasks depicted in FIG. 5 can be performed simultaneously or in a different order than that depicted.

At task 510, if caching is enabled, source node 201-$i$ checks its local routing cache for an existing route to destination node 201-$j$, in well-known fashion.

At task 520, execution branches based on whether an existing route was found in the routing cache at step 510. If so, execution proceeds to task 530, otherwise execution continues at task 540.

At task 530, source node 201-$i$ transmits one or more messages to destination node 201-$j$ via the existing route, in well-known fashion. After task 530 is performed, the method of FIG. 5 terminates.

At task 540, source node 201-$i$ broadcasts a route request (RREQ) of the form (sourceID, destID, seqNum), where sourceID identifies the source node (node 201-1 in illustrative network 200), destID identifies the destination node (node 201-8 in network 200), and seqNum is a source-initiated sequence number that enables nodes to detect when they receive duplicate route requests. Source node 201-*i* also broadcasts, along with the route request, single-node path <sourceID>, and the value of the selected load metric at node 201-*i* (typically zero). The route request and accompanying information is received by all nodes within the wireless transmission range of node 201-*i* (in the case of illustrative network 200, the route request is broadcast by node 201-1 and is received by nodes 201-2, 201-3, and 201-4).

At task 550, source node 201-*i* waits for a route reply, in well-known fashion.

At task 560, source node 201-*i* receives a route reply that specifies a route R, in well-known fashion.

At task 570, source node 201-*i* inserts route R into its routing cache. (The routing cache might have been invalidated as a result of a timeout or the receipt of a route-error message.)

At task 580, source node 201-*i* transmits one or more messages to destination node 201-*j* via route R, in well-known fashion. After task 580 is performed, the method of FIG. 5 terminates.

Figure 6:
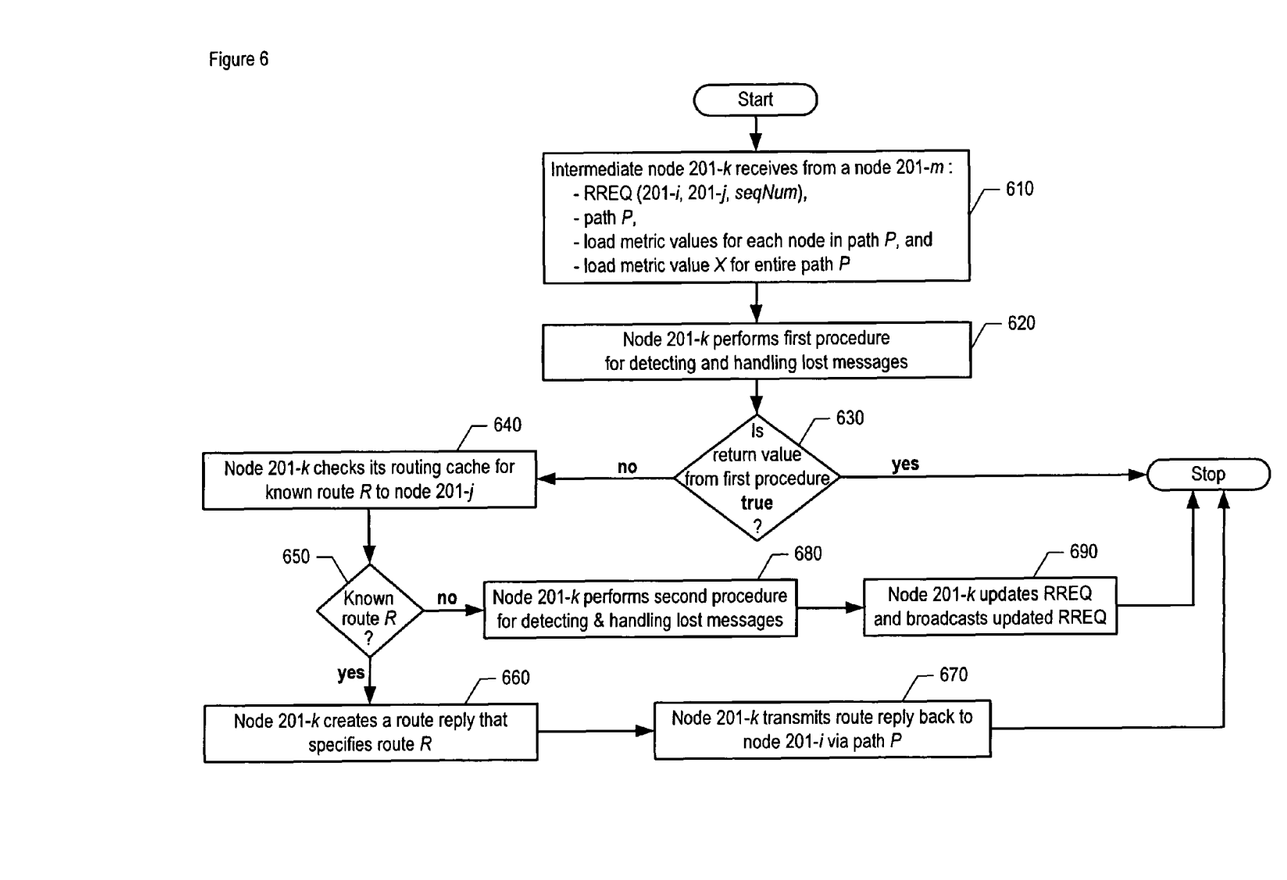
FIG. 6 depicts a flowchart of the salient tasks performed by an intermediate node 201-$k$ during the establishment of a route from source node 201-$i$ to destination node 201-$j$, in accordance with the illustrative embodiment of the present invention.

FIG. 6 depicts a flowchart of the salient tasks performed by an intermediate node 201-*k* during the establishment of a route from source node 201-*i* to destination node 201-*j*, in accordance with the illustrative embodiment of the present invention. It will be clear to those skilled in the art, after reading this disclosure, which tasks depicted in FIG. 6 can be performed simultaneously or in a different order than that depicted.

At task 610, intermediate node 201-*k* receives a route request [RREQ] (201-*i*, 201-*j*, seqNum), a path P, a load metric value for each node in path P, and a load metric value X for the entire path P.

At task 620, intermediate node 201-*k* performs a first procedure for detecting and handling some types of lost messages. Task 620 is described in detail below and with respect to FIG. 7.

At task 630, execution branches based on the return value of the first procedure. If the return value is true, the method of FIG. 6 terminates, otherwise execution proceeds to task 640.

At task 640, if caching is enabled, intermediate node 201-*k* checks its routing cache for a known route R to destination node 201-*j*.

At task 650, execution branches based on whether a known route R was found at task 640. If so, execution proceeds to task 660, otherwise execution continues at task 680.

At task 660, intermediate node 201-*k* creates a route reply that specifies route R.

At task 670, intermediate node 201-*k* transmits the route reply back to source node 201-*i* via path P. After task 670, the method of FIG. 6 terminates.

At task 680, intermediate node 201-*k* performs a second procedure for detecting and handling some types of lost messages. Task 680 is described in detail below and with respect to FIG. 8.

At task 690, intermediate node 201-*k* updates the route request received at task 610 and broadcasts the updated RREQ. Task 690 is described in detail below and with respect to FIG. 9. After task 690, the method of FIG. 6 terminates.

Figure 7:
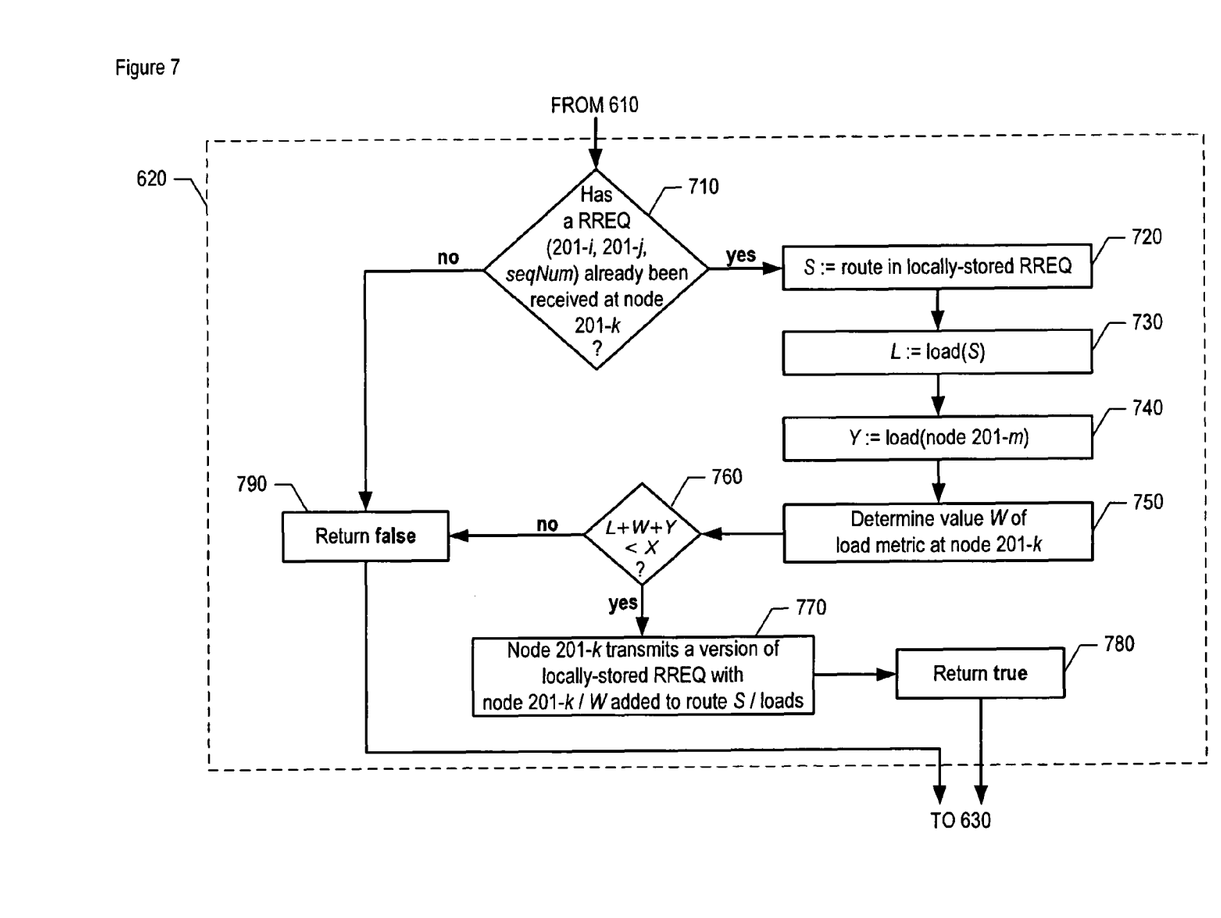
FIG. 7 depicts a detailed flowchart of task 620, as depicted in FIG. 6, in accordance with the illustrative embodiment of the present invention.

FIG. 7 depicts a detailed flowchart of task 620 in accordance with the illustrative embodiment of the present invention. It will be clear to those skilled in the art, after reading this disclosure, which tasks depicted in FIG. 7 can be performed simultaneously or in a different order than that depicted.

At task 710, execution branches based on whether intermediate node 201-*k* has already received a route request (201-*i*, 201-*j*, seqNum). If so, execution proceeds to task 720, otherwise execution continues at task 790.

At task 720, intermediate node 201-*k* sets variable S to the route in the locally-stored route request.

At task 730, intermediate node 201-*k* sets variable L to the load of route S. In the illustrative embodiment, the overall load of a route is included in route requests in addition to the individual loads at one or more nodes in the route. However, as will be appreciated by those skilled in the art, in some other embodiments of the present invention the individual loads might be specified for every node in the route, but not the overall load of the route, in which case intermediate node 201-*k* computes L accordingly at task 730.

Moreover, in this disclosure, for simplicity, the load of a route is defined as the sum of the loads of nodes in the route. However, as will be appreciated by those skilled in the art, in some other embodiments of the present invention some other "load-combining function" might be employed to determine the load of a route from the loads of the route's nodes (e.g., the maximum load along a route, some other non-linear function of the nodes' loads, etc.), and it will be clear to those skilled in the art, after reading this disclosure, how to modify task 730 accordingly to support the desired load-combining function.

At task 740, intermediate node 201-*k* sets variable Y to the value of the load metric at node 201-*m*, the node that transmitted the route request received at task 610. (This Value is specified in the route request.)

At task 750, intermediate node 201-*k* determines the value W of its load (i.e., the value of the load metric at node 201-*k*).

At task 760, intermediate node 201-*k* branches based on whether $L+W+Y<X$. If this inequality holds, then node 201-*m* must not have ever received the route request that node 201-*k* previously transmitted—for otherwise node 201-*m* would not have had the too-high value X for the load of path P. Execution proceeds to task 770 if this inequality holds, otherwise execution continues at task 790.

At task 770, intermediate node 201-*k* transmits a modified version of the locally-stored route request, with node 201-*k* appended at the end of route S, and the load W node 201-*k* added to the list of loads. As will be appreciated by those skilled in the art, in some embodiments of the present invention task 770 might be performed only when re-transmission provides a sufficient benefit (e.g., the metric improves by at least a particular threshold $\Delta$, etc.), while in some other embodiments task 770 might always be performed. It will be clear to those skilled in the art, after reading this disclosure, how to make and use both types of embodiments.

At task 780, intermediate node 201-*k* returns the value true, and execution continues at task 630 of FIG. 6.

At task 790, intermediate node 201-*k* returns the value false, and execution continues at task 630 of FIG. 6.

Figure 8:
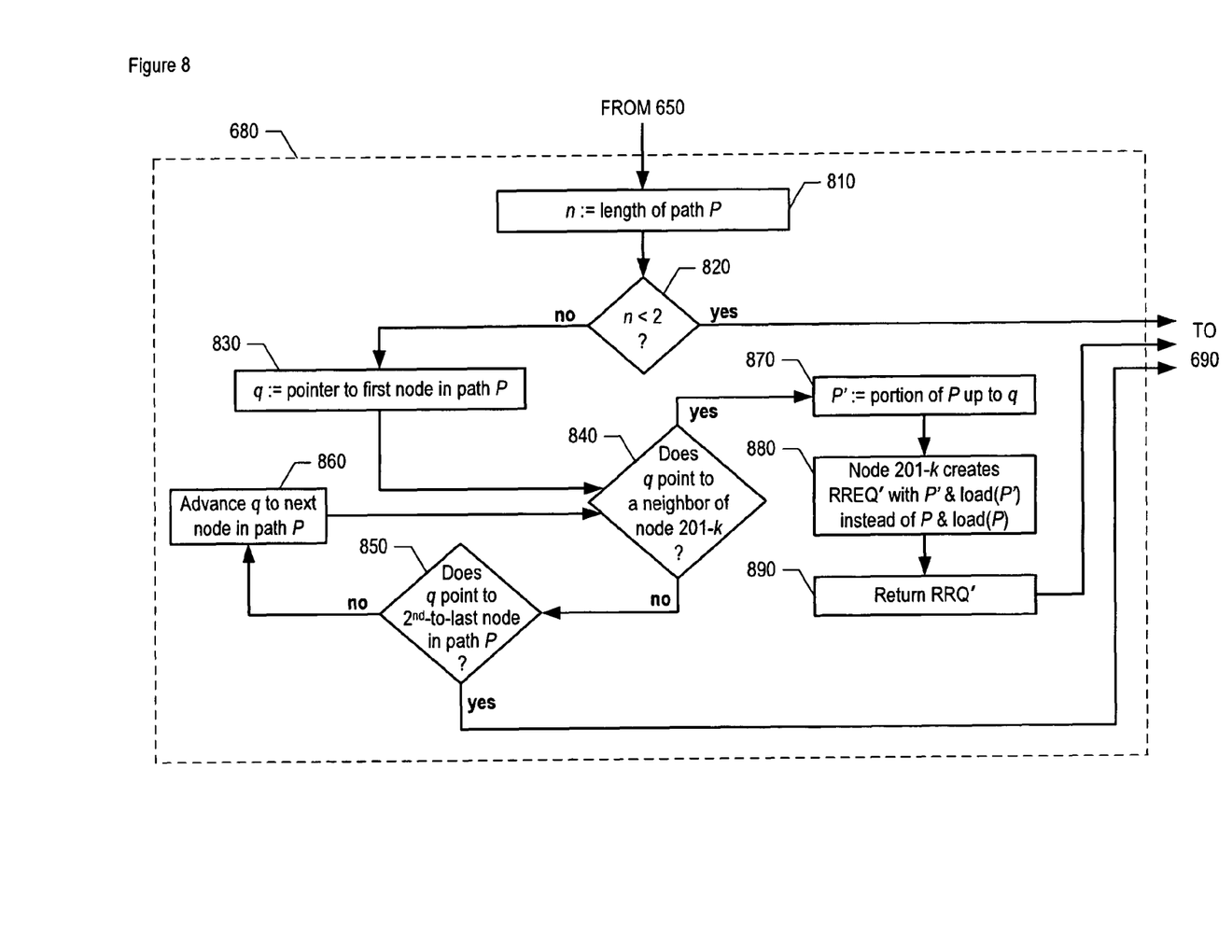
FIG. 8 depicts a detailed flowchart of task 680, as depicted in FIG. 6, in accordance with the illustrative embodiment of the present invention.

FIG. 8 depicts a detailed flowchart of task 680 in accordance with the illustrative embodiment of the present invention. It will be clear to those skilled in the art, after reading this disclosure, which tasks depicted in FIG. 8 can be performed simultaneously or in a different order than that depicted.

At task 810, variable n is set to the length of path P (i.e., the number of nodes in path P).

At task 820, execution branches based on the value of n. If $n<2$ (i.e., path P consists solely of source node 201-*i*), then task 680 terminates and execution continues at task 690; otherwise, execution proceeds to task 830.

At task 830, intermediate node 201-*k* initializes variable q to point to the first node in path P.

At task 840, execution branches based on whether the node pointed to by q is a neighbor of node 201-*k* (i.e., one hop away from 201-*k*). If not, then execution proceeds to task 850, otherwise execution continues at task 870.

At task 850, execution branches based on whether q points to the second-to-last node in path P. If so, task 680 terminates and execution continues at task 690; otherwise, execution proceeds to task 860.

At task 860, intermediate node 201-*k* advances variable q to the next node in path P. After task 860, execution continues back at task 840 for another iteration of the loop. (As will be appreciated by those skilled in the art, the loop is guaranteed to terminate because each node only receives messages from its neighbors.)

At task 870, variable P' is set to the portion of path P from source node 201-*i* to the node pointed to by q, inclusive.

At task 880, intermediate node 201-*k* creates an updated version RREQ' of the route request RREQ received at task 610, where P and load(P) are replaced by P' and load(P').

At task 890, intermediate node 201-*k* returns RREQ'. After task 890, execution proceeds to task 690 of FIG. 6.

Figure 9:
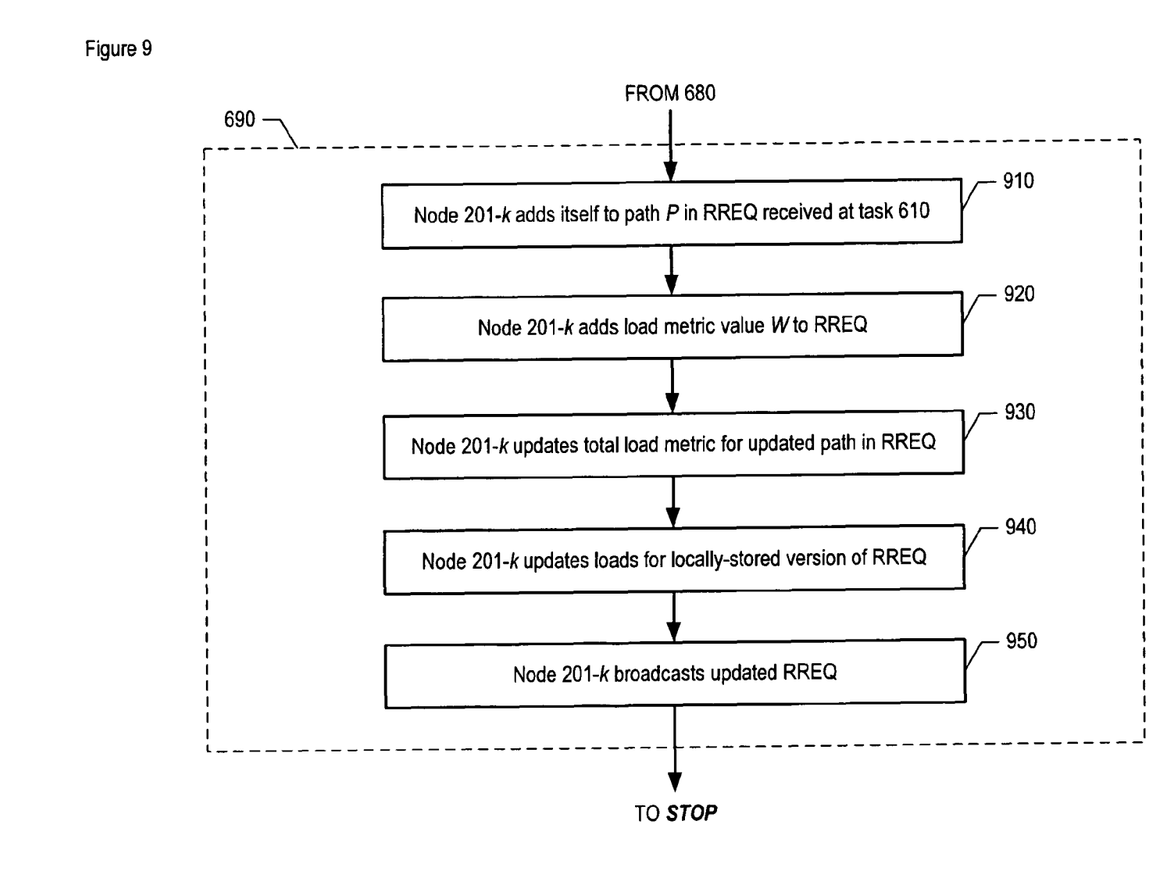
FIG. 9 depicts a detailed flowchart of task 690, as depicted in FIG. 6, in accordance with the illustrative embodiment of the present invention.

FIG. 9 depicts a detailed flowchart of task 690 in accordance with the illustrative embodiment of the present invention. It will be clear to those skilled in the art, after reading this disclosure, which tasks depicted in FIG. 9 can be performed simultaneously or in a different order than that depicted.

At task 910, intermediate node 201-*k* adds itself to path P in the route request received at task 610.

At task 920, intermediate node 201-*k* adds load metric value W (the load at node 201-*k*) to the route request received at task 610.

At task 930, intermediate node 201-*k* updates the total load metric for the updated path n the route request received at task 610.

At task 940, intermediate node 201-*k* updates any load metric values as necessary for the locally-stored version of the route request.

At task 950, intermediate node 201-*k* broadcasts the updated route request. After task 950, task 690 is completed, and the method of FIG. 6 terminates.

Figure 10:
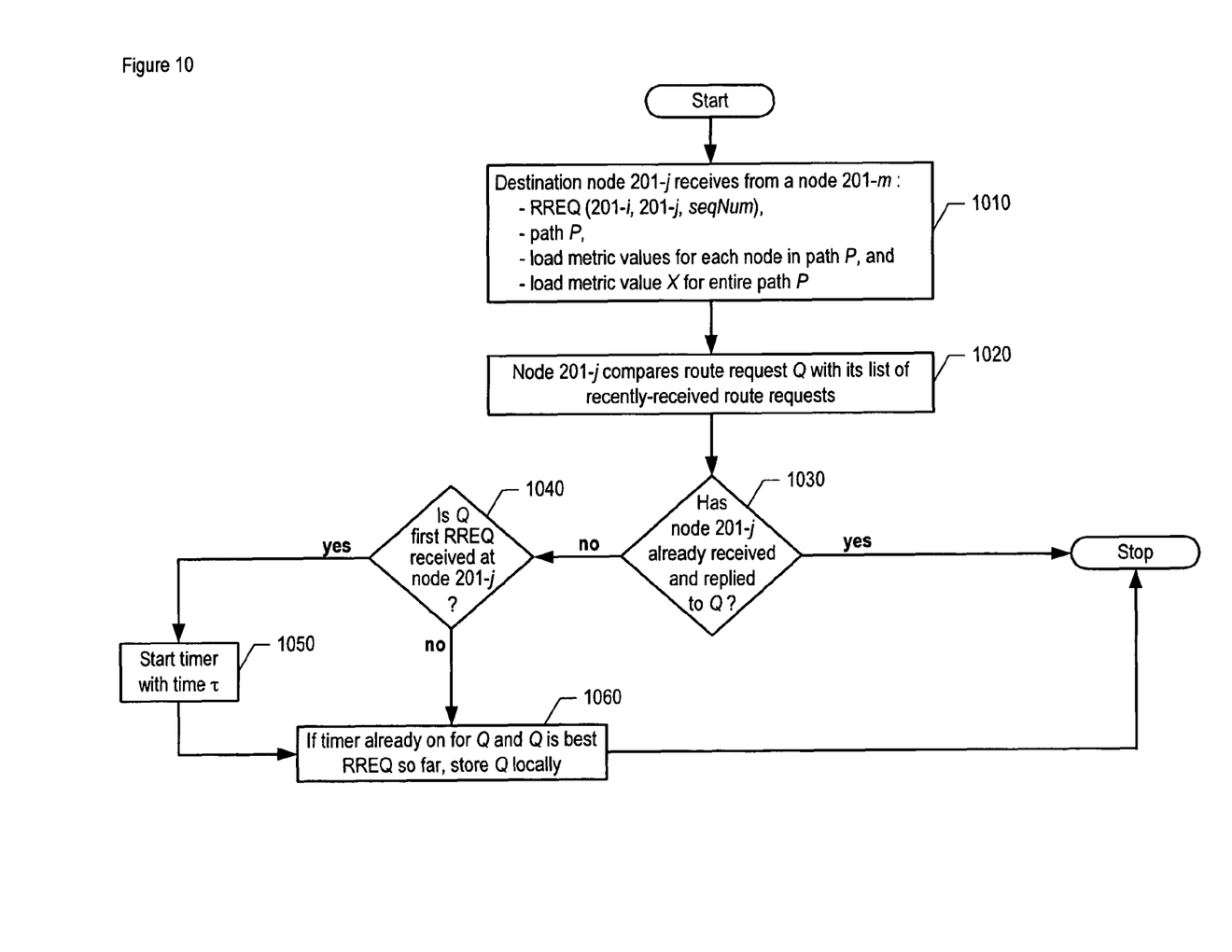
FIG. 10 depicts a flowchart of the salient tasks performed by destination node 201-$j$ in establishing a route from source node 201-$i$ to node 201-$j$, in accordance with the illustrative embodiment of the present invention.

FIG. 10 depicts a flowchart of the salient tasks performed by destination node 201-*j* in establishing a route from source node 201-*i* to node 201-*j*, in accordance with the illustrative embodiment of the present invention. It will be clear to those skilled in the art, after reading this disclosure, which tasks depicted in FIG. 10 can be performed simultaneously or in a different order than that depicted.

At task 1010, destination node 201-*j* receives a route request (RREQ) Q, a path P, a load metric value for each node in path P, and a load metric value X for the entire path P.

At task 1020, destination node 201-*j* compares route request Q with its list of recently-received route requests.

At task 1030, execution branches based on whether destination node 201-*j* already received and replied to route request Q. If so, execution of the method terminates, otherwise execution continues at task 1040.

At task 1040, execution branches based on whether route request Q is the first route request received at destination node 201-*j*. If so, execution proceeds to task 1050, otherwise execution continues at task 1055.

At task 1050, destination node 201-*j* starts a timer with time τ. During this time interval of length τ, destination node 201-*j* collects all incoming requests. When the timer expires, the destination selects the best route and includes it in the generated route reply, as described below and with respect to FIG. 11.

As will be appreciated by those skilled in the art, there is a tradeoff in determining timeout value τ: it should be long enough to collect all the route requests, but at the same time it shouldn't increase the overall end-to-end delay or cause source node 201-*i* to timeout and send a new request. In the illustrative embodiment, the value of τ is proportional to the propagation time of the first request from source node 201-*i* to destination node 201-*j*, where the particular proportionality constant is based on the value of the route request (RREQ) timeout. This results in a value of τ that accounts for how congested the network is, while maintaining independence from path length.

As will be appreciated by those skilled in the art, in some other embodiments of the present invention, the value of τ might be chosen or determined in some other way (e.g., based on empirical observations, based on simulation results, etc.).

At task 1060, destination node 201-*j* checks whether a timer is already on for route request Q and if it is, destination node 201-*j* stores Q locally if it is the best route request received so far. After task 1060, the method of FIG. 10 terminates.

Figure 11:
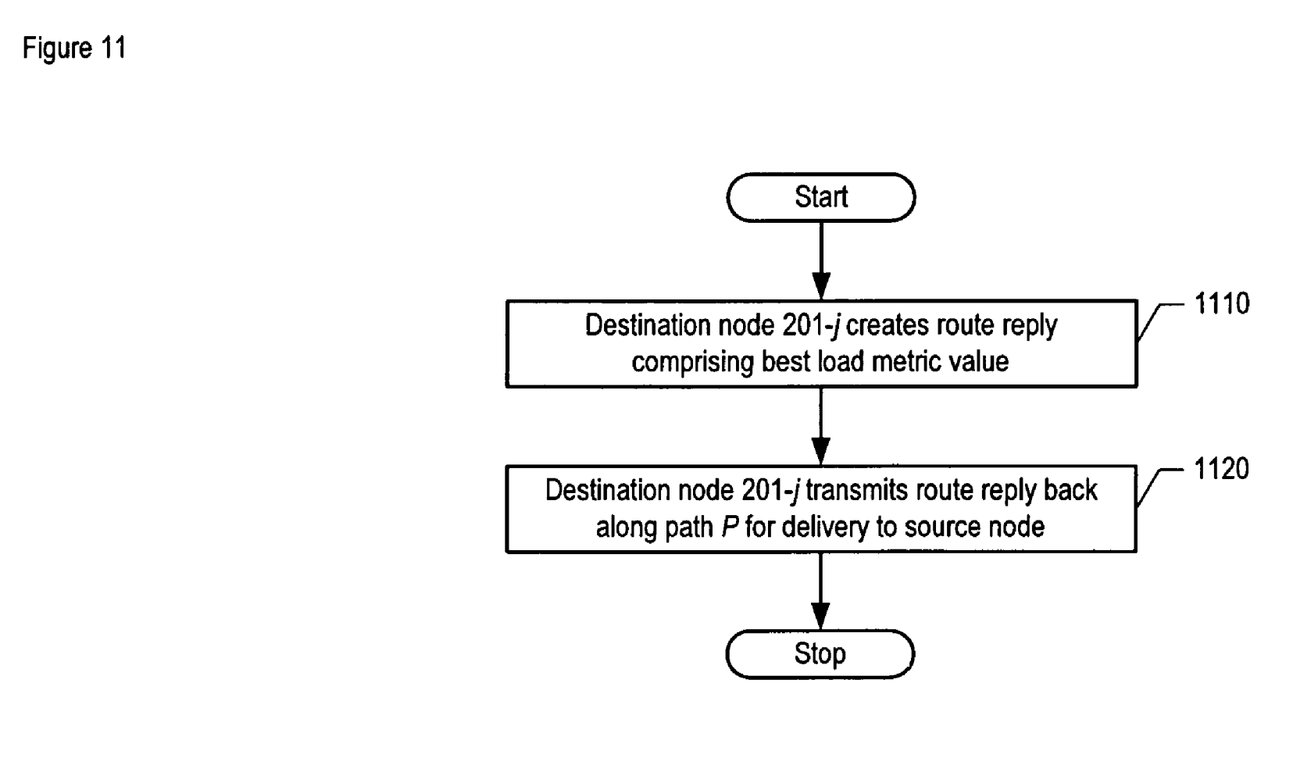
FIG. 11 depicts a flowchart of the salient tasks performed by destination node 201-$j$ when a timer set in the method of FIG. 10 expires, in accordance with the illustrative embodiment of the present invention.
Figure 12:
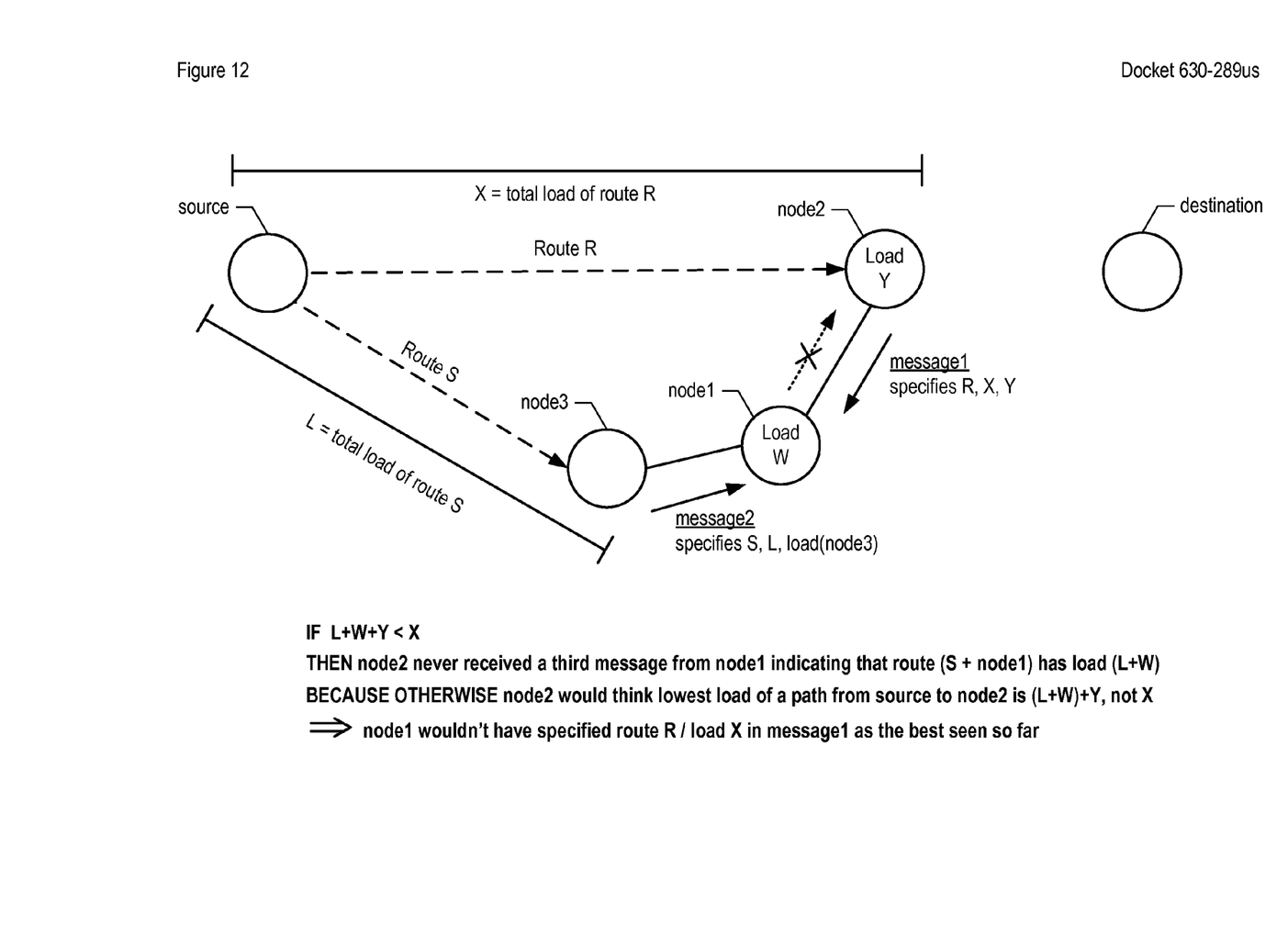
FIG. 12 depicts the elements recited in claim 1 and illustrates the rationale for inferring that a third routing-protocol message was not received.

FIG. 11 depicts a flowchart of the salient tasks performed by destination node 201-*j* when the timer set in the method of FIG. 10 expires, in accordance with the illustrative embodiment of the present invention. It will be clear to those skilled in the art, after reading this disclosure, which tasks depicted in FIG. 11 can be performed simultaneously or in a different order than that depicted.

At task 1110, destination node 201-*j* creates a route reply comprising the best (e.g., lowest, etc.) load metric value encountered at the node.

At task 1120, destination node 201-*j* transmits the route reply back along path P for delivery to source node 201-*i*. After task 1120, the method of FIG. 11 terminates.

As will be appreciated by those skilled in the art, the methods of FIGS. 10 and 11 employ a strategy in which destination node 201-*j* replies with the best metric seen so far after the timer has expired. As will be appreciated by those skilled in the art, some other embodiments of the present invention might employ alternative strategies, and it will be clear to those skilled in the art, after reading this disclosure, how to make and use such embodiments.

As will be appreciated by those skilled in the art, although the illustrative embodiment of the present invention is disclosed in the context of multi-hop ad-hoc wireless networks, some or all of the techniques of the illustrative embodiment might also be employed in other kinds of networks. Similarly, although the illustrative embodiment is disclosed in the context of load metrics, the techniques of the illustrative embodiment might also be employed for other kinds of metrics, such as an energy metric that quantifies the energy (e.g., battery power, etc.) required to route a message through particular nodes. Moreover, although the illustrative embodiment of the present invention is disclosed in the context of on-demand routing, some or all of the techniques of the illustrative embodiment might also be employed in networks that use proactive routing.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   (a) receiving at a first node in a network a first message from a second node in said network, wherein said first message is for establishing a route in said network from a source node in said network to a destination node in said network, and wherein said first message comprises (i) a route R from said source node to said second node, and
(ii) a value of a load metric at one or more nodes in said route R;
(b) determining the value W of said load metric at said first node;
(c) receiving at said first node from a third node in said network, after the receipt of said first message, a second message that is for establishing the route in said network from said source node to said destination node; and
(d) inferring, after the receipt of said second message, that said second node did not receive a third message transmitted by said first node, when:
(i) said first message indicates a value Y for said load metric at said second node;
(ii) said first message indicates a value X for said load metric summed over the nodes in said route R;
(iii) said second message comprises a route S that starts from said source node and does not include said second node;
(iv) said second message indicates a value L for said load metric summed over the nodes in said route S; and
(v) L+W+Y<X.

2. The method of claim 1 wherein said first message and said second message are multicast messages.

3. The method of claim 1 wherein said network is a multi-hop ad-hoc wireless network.

4. The method of claim 3 wherein said second node is a single hop from said first node.

5. The method of claim 1 further comprising:
(e) transmitting from said first node a fourth message that is for establishing a route in said network from said source node to said destination node;
wherein said third message comprises:
(i) a route S that starts from said source node and does not include said second node, and
(ii) the value of said load metric at one or more nodes in said route S; and
wherein said fourth message comprises:
(i) a route S' consisting of said route S plus said first node appended at the end, and
(ii) the value of said load metric at one or more nodes in said route S'.

6. The method of claim 1 further comprising:
(e) inferring, after the receipt of said first message, that said first node did not receive a message transmitted by a third node in said network.

7. A method comprising:
(a) receiving at a first node in a network a first message from a second node in said network, wherein said first message is for establishing a route in said network from a source node in said network to a destination node in said network, and wherein said first message comprises
(i) a route R from said source node to said second node, and
(ii) a value of a load metric at one or more nodes in said route R;
(b) determining the value W of said load metric at said first node;
(c) receiving at said first node from a third node in said network, after the receipt of said first message, a second message that is for establishing the route in said network from said source node to said destination node; and
(d) inferring, after the receipt of said second message, that said second node did not receive a third message transmitted by said first node, when:
(i) said first message indicates a value Y for said load metric at said second node;
(ii) said first message indicates a value X for said load metric for said route R;
(iii) said second message comprises:
(1) a route S that starts from said source node and does not include said second node, and
(2) a vector $\vec{L}$ of load metric values corresponding to the nodes in said route S;
(iv) the value Z of said load metric for route [S+said first node+said second node] is based on said load metric values $\vec{L}$, W, and Y; and
(v) Z<X.

8. The method of claim 7 wherein said first message and said second message are multicast messages.

9. The method of claim 7 wherein said network is a multi-hop ad-hoc wireless network.

10. The method of claim 9 wherein said second node is a single hop from said first node.

11. The method of claim 7 further comprising:
(e) transmitting from said first node a fourth message that is for establishing a route in said network from said source node to said destination node;
wherein said third message comprises:
(i) a route S that starts from said source node and does not include said second node, and
(ii) the value of said load metric at one or more nodes in said route S; and
wherein said fourth message comprises:
(i) a route S' consisting of said route S plus said first node appended at the end, and
(ii) the value of said load metric at one or more nodes in said route S'.

12. The method of claim 7 further comprising:
(e) inferring, after the receipt of said first message, that said first node did not receive a message transmitted by a third node in said network.

* * * * *